June 15, 1965 W. J. SACKETT, SR 3,189,434
METHOD FOR THE MANUFACTURE OF GRANULAR FERTILIZER
Filed Sept. 14, 1962 4 Sheets-Sheet 1

INVENTOR
WALTER J. SACKETT, SR.
BY Walter G. Finch
ATTORNEY

INVENTOR
WALTER J. SACKETT, SR.
BY Walter G. Finch
ATTORNEY

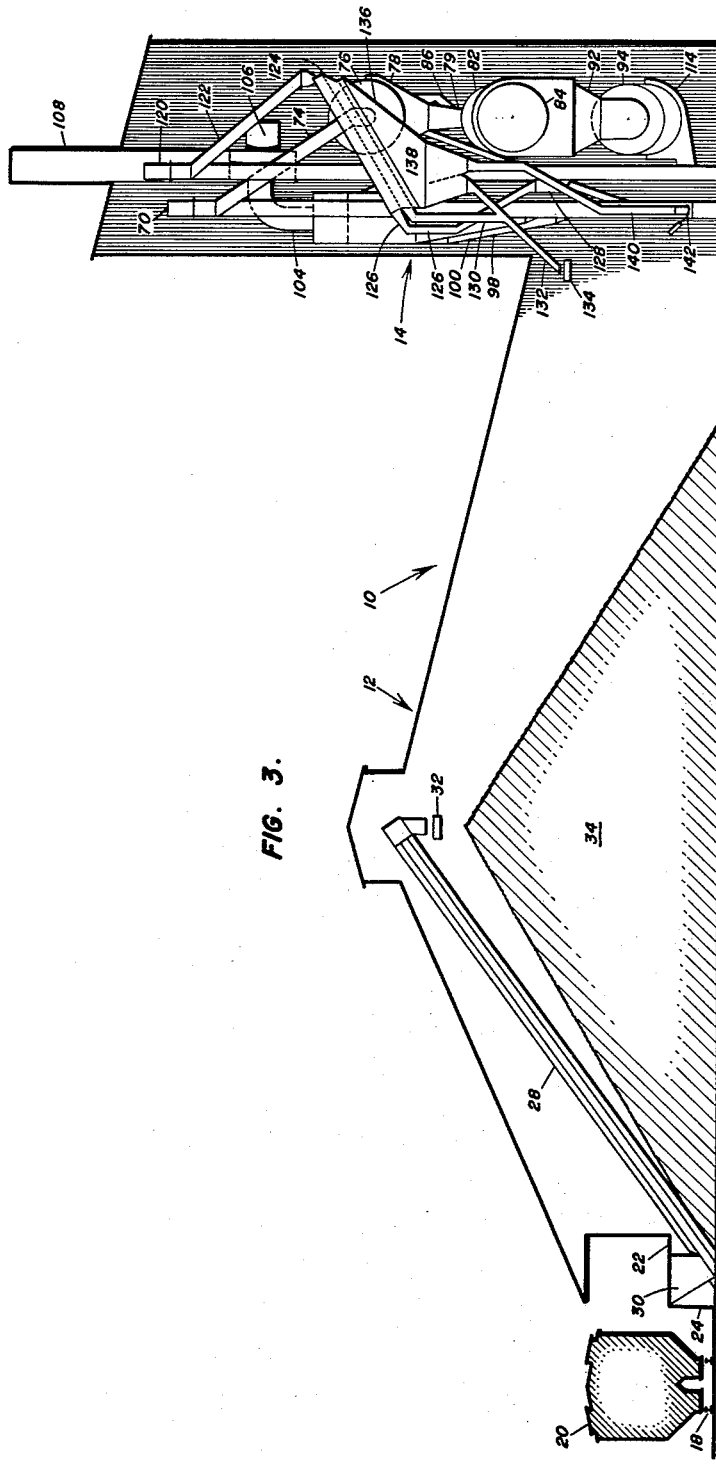

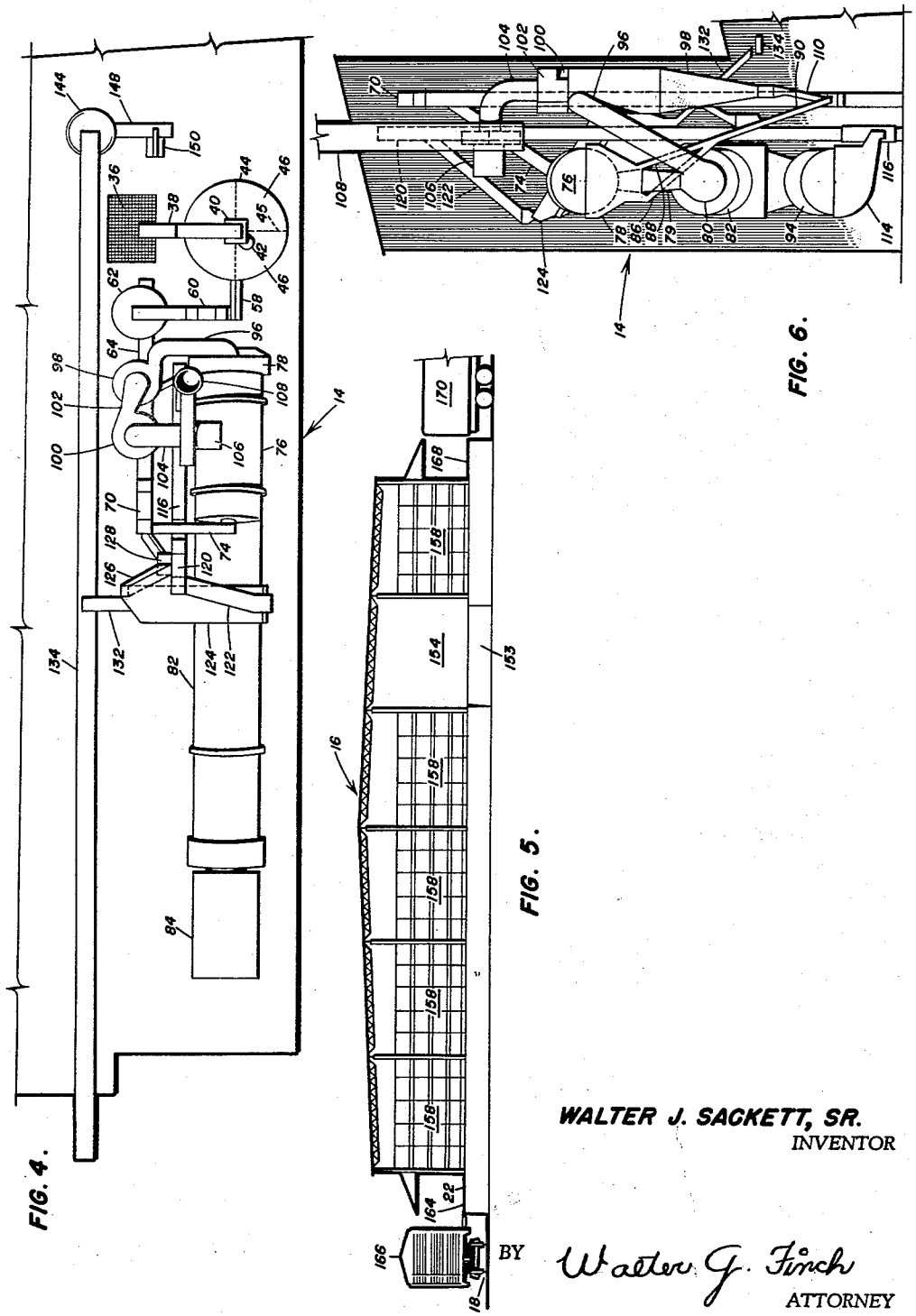

United States Patent Office 3,189,434
Patented June 15, 1965

3,189,434
METHOD FOR THE MANUFACTURE OF GRANULAR FERTILIZER
Walter J. Sackett, Sr., Baltimore, Md., assignor to The A. J. Sackett & Sons Company, Baltimore, Md., a corporation of Maryland
Filed Sept. 14, 1962, Ser. No. 223,614
2 Claims. (Cl. 71—64)

This invention relates generally to processing plants, and more particularly it pertains to a new combination and arrangement of apparatus and method for processing a plurality of raw ingredients from the time of their delivery to the final bagging and storage for shipment of a manufactured granular product.

In certain manufacturing processes, for example, the production of ammoniated granular fertilizers, it is necessary to recycle a portion of the product perhaps several times within and between several machines. Various combinations of the several raw ingredients are used and the finished product is packaged in bags or delivered in bulk form.

It can thus be understood that considerable involved handling is required at every stage in such a process and this can be a major part of the cost.

It is an object of this invention, therefore, to provide a manufacturing plant and system comprising batching, weighing, blending, treating, granulating, and classifying machines whereby a uniform acceptable granular product is delivered for bagging, storage, and/or bulk sale and all non-acceptable product is recycled for reprocessing by the same machines.

Another object of this invention is to provide a coordinated ammoniated fertilizer plant and system of high efficiency requiring a minimum of material handling whereby a lower cost fertilizer product is manufactured.

Another object of this invention is to provide a new type of fertilizer plant which is economical to manufacture and install, efficient and reliable in operational use, easily maintained, and wherein the manufactured product can be quickly and effectively stored in suitable plastic type containers for short or long periods of time for further distribution to purchasers thereof.

Other objects and attendant advantages of this invention will become more readily apparent from the following detailed specification and accompanying drawings wherein:

FIG. 3 is a diagrammatic cross-section taken along line 3—3 of FIG. 1;

FIG. 4 is a plan view of the manufacturing and processing unit illustrated in FIG. 2;

FIG. 5 is a cross-section, to a slight, reduced scale, through the product storage department of the plant of the present invention and is taken along line 5—5 of FIG. 1; and FIG. 6 is a cross-section taken along line 6—6 of FIG. 2.

Figure 1:
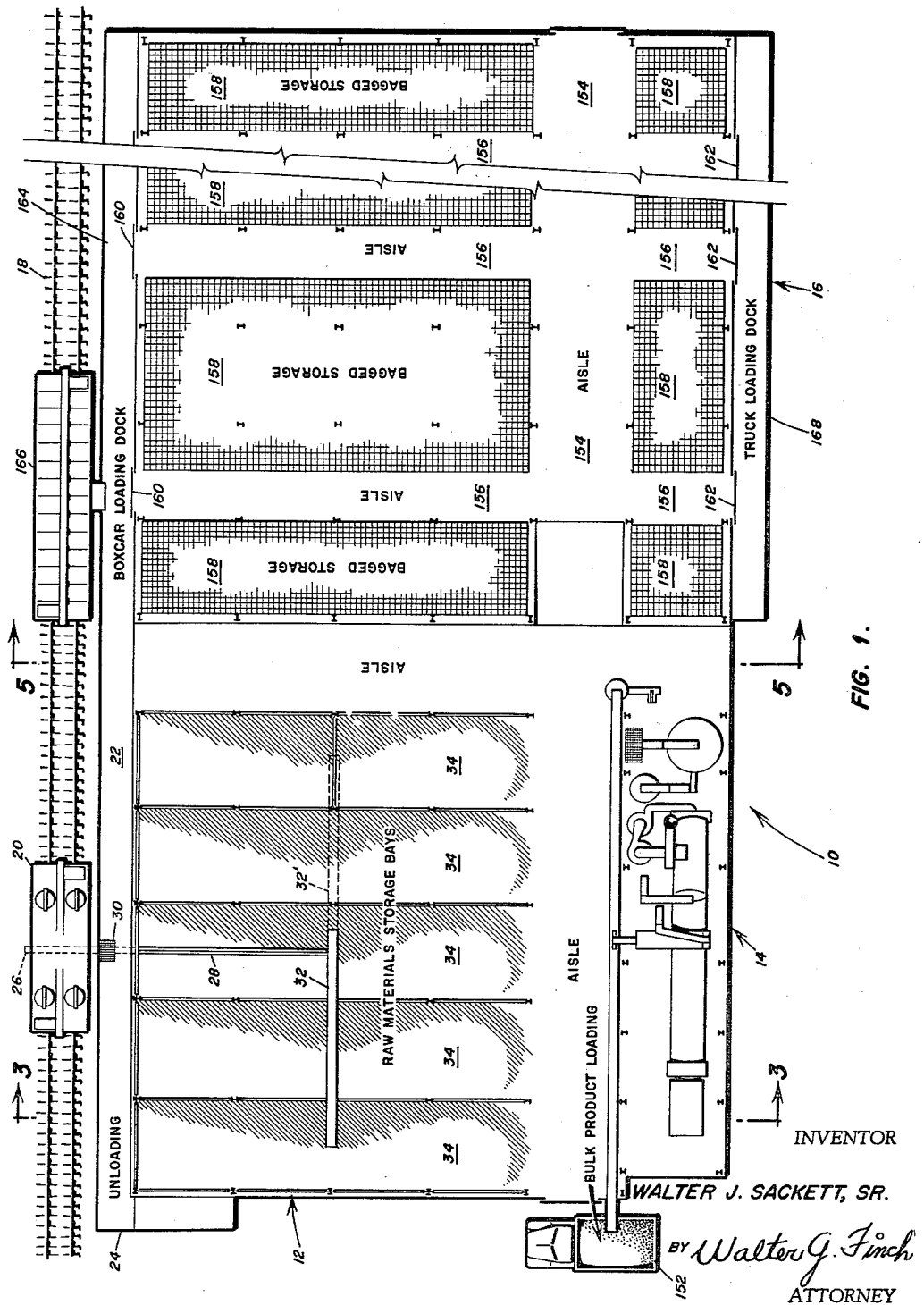
FIG. 1 is a generally diagrammatic illustration, in plan, of the various departments of a new type of manufacturing plant incorporating features of the present invention.

Referring first to FIG. 1 of the drawings, there is shown, generally, a plant 10 arranged for the manufacture, packaging and storage of granular mixed goods, such as plant foods, fertilizer or the like. As shown in FIG. 1, the left-end of the plant is arranged with a raw materials storage area 12 and a processing unit 14. The remaining area within the plant, shown to the right in FIG. 1, includes a product storage area 16.

Various unweighed bulk ingredients are delivered to the plant by a hopper car 20 movably positioned on a railroad siding 18 which lies adjacent a box car loading dock 22. The contents of the hopper car 20 shown near the unloading end 24 of the dock 22, are discharged, between the rails of siding 18, into the receiving end 26 of an enclosed conveyor system 28.

The bulk material is then elevated by the conveyor 28 and discharges onto a reversible traversing conveyor belt 32 which, in turn, delivers the raw material to one of a plurality of storage bays 34.

FIG. 1 shows the belt 32 as it would appear when delivering material to the extreme left bay. The belt can, of course, be positioned to deliver to any one of the bays 34. For example, moving the entire belt 32 to the position indicated by dashed line 32' and reversing its direction of travel, will cause the belt 32 to deliver to the extreme right bay 34.

The unloading end 24 of the box car loading dock 22 is further arranged to receive bulk raw materials from a box car 20. A ramp or spill apron (not shown) would be placed so as to span the gap between the door of the car 20 and the dock 22 after which the material would be removed from the car 20 by a payloader, or the like, and then deposited into a grating covered hopper 30 from which it would pass into the conveyor 28 as previously described.

Figure 2:
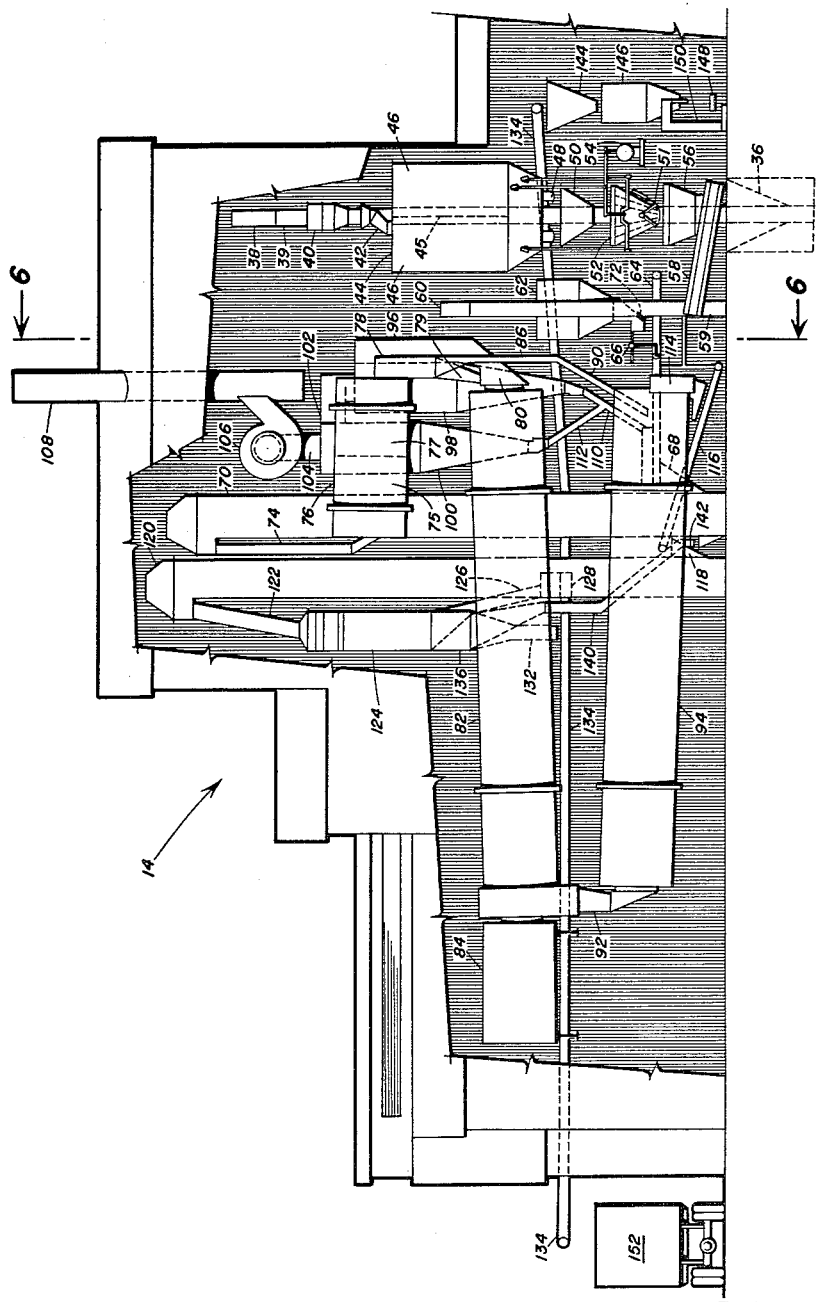
FIG. 2 is a diagrammatic elevation, to an enlarged scale with certain elements broken away, of the manufacturing and processing unit, of the present invention, which appears at the lower left corner of FIG. 1.

When manufacturing various unweighed bulk ingredients are selected and delivered by payloader, or the like, to a grating covered charging hopper 36 best illustrated in FIG. 4, from which they are conveyed by a steel cased bucket elevator 38, as shown best in FIG. 2, to a short chute 39 through which they are carried by gravity into a mill 40 whose function it is to crush any over-size material. The bucket elevator 38 is preferably, as are all succeedingly mentioned elevators, of a sectionalized type fully described in my co-pending U.S. patent application, Serial Number 175,757, filed February 26, 1962, entitled "Bucket Elevator System."

The materials are then guided by a bin selector 42, fully disclosed in my co-pending U.S. patent application Serial Number 115,203, filed June 6, 1961, entitled "Multi-Compartment Bulk Station" into one of a plurality of compartments or bins 46 which are arranged within a batching hopper 44. The batching or storage hopper 44 is provided with a plurality of partitions 45 and can be arranged to accommodate up to eight ingredients.

The particular hopper 44 disclosed in the drawings is divided into four compartments 46 each of which is equipped, at its bottom, with a pneumatically operated discharge gate 48.

The materials from hopper 44 are discharged by gates 48 into a funnel 50 which tends to center the falling materials as they enter a weighing and blending hopper 52 which is suspended, directly below the funnel 50, from hopper 44. The weigh-blending hopper 52, whose construction and functions are fully detailed in my co-pending U.S. patent application Serial Number 43,838, filed July 19, 1960, now Patent No. 3,091,369 entitled "Weighing and Mixing Hopper," is provided with a large pneumatically operated valve 51 for rapid discharge of the ingredients into a feed hopper 56 therebelow.

The weighing of the various ingredients as well as the discharging of a completed batch is accomplished from a central control console (not shown) which would be located directly in front of scale 54 shown only in FIG. 2. The scale furnished with this system is equipped with a recording device which will provide a daily printed record of the batch weighing accomplished during an operating period.

Upon completion of weighing of the component ingredients, the batch becomes thoroughly mixed upon discharging from the weigh-blending hopper 52 into the feed hopper 56. The mixed solid ingredients then undergo further mixing while being carried by an enclosed conveyor 58 to the boot section 59 of a second elevator 60. Elevator 60 delivers the mixed ingredients to a surge hopper 62 from which they flow onto a reversible conveyor 64 at a rate accurately governed by a self-compensating type continuous weighing machine 66.

The conveyor 64 delivers the metered flow of dry blended ingredients into the boot 68 of a third elevator 70 which discharges the ingredients into a gravity chute 74 from which they pass into the ammoniating section 75 of a combination ammoniator-granulator 76, as fully described in my U.S. Letters Patent No. 3,022,142, issued February 20, 1962, for "Ammoniator Granulator Apparatus."

Before proceeding further, it should be explained that quite frequently upon completion of an operating period, a considerable amount of the various ingredients will, more than likely, remain within the compartments 46 of batching hopper 44. If the ingredients are allowed to remain overnight they may, when sufficient humidity exists, tend to lump thereby becoming unsuitable for accurate weighing purposes.

In such an instance, the valve 48 to a compartment 46 will be opened as will also be valve 51 thereby permitting the material from the compartment 46 to fall through funnel 50 and weigh hopper 52 into the feed hopper 56. The unsuitable material will then be passed by conveyor 58 and the elevator 60 into the surge hopper 62 from which it will exit through a rear gate 72 onto the belt 64 whose motion has been reversed so as to dump the material back into the charging hopper 36.

The material will then be carried once again, upwardly through the elevator 38 and the chute 39 into mill 40 wherein it will be restored to proper size and then be returned to its particular compartment 46. The above step will, of course, be repeated for as many materials as are stored within the batching hopper 44.

To continue, the fertilizer ingredients are fed at a constant rate through the chute 74 into the ammoniator section 75 of the combined ammoniator-granulator 76, a full disclosure of which appears in my U.S. Letters Patent No. 3,022,142, mentioned above. The materials in ammoniating section 75 are introduced to and thoroughly mixed with ammonia and acids after which they pass into the granulating section 77.

Heated air from the ammoniating reaction is drawn lengthwise of the ammoniator-granulator toward the discharge or right hand end as viewed in FIG. 2. It is replaced by cool dry air which is drawn through the inlet chute 74 with the incoming materials, and which is then passed over the reacting materials in the ammoniating process. The hot air surface hardens the granules being formed from the mixture tumbling with the granulating section 77.

Upon completion of the ammoniation-granulation phase of the process, the granules or pellets emerge from the granulating section 77 and enter a preclassifier 78, a full understanding of which may be readily gained from an examination of my co-pending U.S. patent application Serial Number 93,644, filed March 6, 1961, now abandoned, entitled "Ammoniator-Granulator System for Separating Classes of Granules."

A trio of chutes, namely 79, 86, and 88 stem downwardly from the preclassifier 78, as best seen in FIG. 6. The elements of the preclassifier 78 are so arranged as to separate the output of ammoniator-granulator 76 into three groups of granules, namely "acceptable," "oversize," and "fines." The "oversize" product and the fines will pass into a pair of converging chutes 86 and 88, respectively, and will then be combined within and delivered by chute 90 to conveyor 64 which will return them by means of elevator 70 and chute 74 to the ammoniator-granulator 76 for reprocessing.

The acceptably sized granules from the granulator section 77 will fall through the chute 79 into the intake 80 of a gas-fired direct heat rotary dryer 82 which derives its heat from a refractory lined furnace 84.

Granules from the dryer 82 then pass through a chute 92 into a rotary cooler 94 where they are cooled by a counter-current air flow.

As best noted in FIGS. 2 and 6, moisture from both the dryer 82 and the cooler 94 is exhausted to atmosphere by passing in the following order, through an exhaust duct 96, a cyclone 98, a tangential duct 102, a cyclone 100, a duct 104, a fan 106 and finally a stack 108. Series connected cyclones 98 and 100 recover fine dust through duct 96 from both the dryer 82 and the cooler 94.

The granules are next discharged from cooler 94 into the duct 114 through which they pass onto the conveyor 116 to be delivered to the boot section 118 of a fourth elevator 120. The elevated granules are then dropped through a chute 122 onto a double deck classifying screen 124. This particular screen 124 again sorts the granules into three classifications, namely, oversize, finished product and fines.

As best seen in FIG. 3, the oversize granules are passed through a chute 126 to a mill 128 wherein they are crushed and then returned for reclassification through the elevator 120 and the chute 122 to the screen 124.

The finished product then passes through the chutes 130 and 132 to a conveyor belt 134 for delivery to packaging.

The fines, or undersized granules, passing completely through the screen unit 124 enter a hopper 136 which contains a "fines splitter," or valve gate, 138. The "splitter" 138 for the fines can be adjusted to a setting which will direct an acceptable or allowable portion of the fines to pass, through chute 132, to packaging. The remainder of the fines will be returned for reprocessing through a chute 140 to an adjustable dribble valve 142 which will slowly allow the rejected fines to combine with the virgin mixture being conveyed by elevator 70 and chute 74 to the ammoniator-granulator 76.

Cyclones 98 and 100 are each equipped inside their lower end with a vacuum closed valve flap. The fines being recovered by the cyclones 98 and 100 from the air passing therethrough will accumulate until their weight exceeds the ability of the vacuum to maintain the valves closed at which time a portion of the fines within the cyclones 98 and 100 will be released into converging chutes 110 and 112, respectively, through which they will pass onto the conveyor 64. They will then be returned for reprocessing to the ammoniator-granulator 76 by means of elevator 70 and gravity chute 74.

The finished product from the screening unit 124 which has been delivered by the chutes 130 and 132 to the conveyor 134 is then delivered into a surge bin 144 shown at the extreme right end of the conveyor 134 in FIGS. 2 and 4. The product then passes into a bagging machine 146 after which the filled bags, made of Mylar, polyethylene, or equivalent plastic material, are carried by a short conveyor 148 to a bag sealing machine 150. It should be noted that the direction of travel of the long conveyor belt 134 may be reversed whereby the finished product can be delivered in bulk quantities to a truck 152 shown at the extreme left of FIGS. 1 and 2.

Sealed bags of the product arriving from the sealing machine 150 are then stacked upon conventional pallets and then delivered by fork lift by means of a ramp 153, main aisle 154 and transverse aisles 156 to the various storage bays as shown at 158, as best illustrated in FIGS. 1 and 5.

The extreme ends of transverse aisles 160 communicate with doors 160 and 162 which open, respectively, onto the box car loading section 164 of box car loading dock 22 and the truck loading dock 168. Thus it can be seen that the bagged and pelletized product can be rapidly removed from storage and delivered directly, by fork lift, to either a box car 166 or a truck 170.

Obviously many modifications and variations of the present invention are possible in light of the above teachings. It is therefore, to be understood that within the scope of the appended claims the invention may be practiced otherwise than as specifically described.

What is claimed is:

1. A method for the manufacture of granular fertilizer, comprising blending a predetermined amount of raw material ingredients for said granular fertilizer, treating said predetermined amount of ingredients with ammonia and acid, granulating the treated ingredients, classifying the granulated ingredients into first oversize, intermediate, and fine groups of granules, with said intermediate group of granules being the acceptable group, returning said first oversize and fine groups of granules to the treating step, drying and cooling the acceptable group of granules, classifying the dried and cooled granules into second oversize, intermediate, and fine groups of granules, with said second intermediate group of granules being a second acceptable group, adding a predetermined proportion of said second fine group of granules to said second acceptable group, packaging the resulting group of granules, returning the remainder of said second fine group of granules to the treating step, comminuting the second oversize group of granules, and returning the comminuted granules to the last mentioned classifying step.

2. A method for the manufacture of granular fertilizer, comprising blending a predetermined amount of raw material ingredients for said granular fertilizer, treating said predetermined amount of ingredients with ammonia and acid, granulating the treated ingredients, classifying the granulated ingredients into first oversize, intermediate and fine groups of granules, with said intermediate group of granules being the acceptable group, returning said first oversize and fine groups of granules to the treating step, drying and cooling the acceptable group of granules with currents of air, whereby fine granules become entrained in said currents of air, recovering said entrained fine granules and returning them to the treating step, classifying the dried and cooled granules into second oversize, intermediate, and fine groups of granules, with said second intermediate group of granules being a second acceptable group, adding a predetermined proportion of said second fine group of granules to said second acceptable group, packaging the resulting group of granules, returning the remainder of said second fine group of granules to the treating step, comminuting the second oversize group of granules, and returning the comminuted granules to the last mentioned classifying step.

References Cited by the Examiner
UNITED STATES PATENTS

| | | | |
|---|---|---|---|
| 2,175,484 | 10/39 | Rees et al. | 209—12 |
| 2,293,111 | 8/42 | Campbell et al. | 209—12 |
| 2,448,126 | 8/48 | Shoeld | 71—64 |
| 2,504,545 | 4/50 | Waring et al. | 71—64 |
| 2,917,381 | 12/59 | Otto | 71—64 |
| 2,945,754 | 7/60 | Hignett et al. | 71—43 |
| 2,963,359 | 12/60 | Moore et al. | 71—43 |
| 2,965,472 | 12/60 | Huxley et al. | 71—64 |
| 2,978,313 | 4/61 | Moyrand et al. | 71—64 |
| 3,002,831 | 10/61 | Gross et al. | 71—64 |
| 3,029,577 | 4/62 | Hedberg | 209—12 |
| 3,068,076 | 12/62 | Sackett | 71—64 |
| 3,077,266 | 2/63 | Plumb | 209—317 |
| 3,086,718 | 4/63 | Lukas | 209—12 |

DONALL H. SYLVESTER, *Primary Examiner.*

ANTHONY SCIAMANNA, *Examiner.*